(12) United States Patent
Ignatoff et al.

(10) Patent No.: US 7,177,912 B1
(45) Date of Patent: Feb. 13, 2007

(54) SCSI TRANSPORT PROTOCOL VIA TCP/IP USING EXISTING NETWORK HARDWARE AND SOFTWARE

(75) Inventors: Edward N. Ignatoff, Boca Raton, FL (US); Ziya A. Aral, Pompano Beach, FL (US); Roni Putra, Pompano Beach, FL (US); Nicholas C. Connolly, Surrey (GB)

(73) Assignee: Datacore Software Corporation, Ft. Lauderdale, FL (US)

( * ) Notice: Subject to any disclaimer, the term of this patent is extended or adjusted under 35 U.S.C. 154(b) by 1278 days.

(21) Appl. No.: 10/035,790

(22) Filed: Dec. 24, 2001

Related U.S. Application Data

(60) Provisional application No. 60/258,003, filed on Dec. 22, 2000.

(51) Int. Cl.
G06F 15/167 (2006.01)
(52) U.S. Cl. ............... 709/212; 709/213; 709/214; 709/216; 709/203; 711/112; 711/170
(58) Field of Classification Search .............. 709/212, 709/208, 214, 216, 203, 213; 711/112, 170; 707/10
See application file for complete search history.

(56) References Cited

U.S. PATENT DOCUMENTS 5,787,304 A * 7/1998 Hodges et al. ............. 710/1

OTHER PUBLICATIONS

DataCore Software (online) retrieved (Aug. 2, 2000) from the internet <www.datacoresoftware.com>.*
DataCore Software : products (online) retrieved (Aug. 2, 2000 from the Internet. <www.datacoresoftware.com/products/keyfeatures.shtml.>*
DataCore Software [online]. DataCore Software Corporation [retrieved Aug. 2, 2000]. Retrieved from the Internet: <URL: http://www.datacoresoftware.com/.
DataCore Software: Products [online]. DataCore Software Corporation [retrieved Aug. 2, 2000]. Retrieved from the Internet: <URL: http://www.datacoresoftware.com/products.shtml.
DataCore Software: Products [online]. DataCore Software Corporation [retrieved Aug. 2, 2000]. Retrieved from the Internet: <URL: http://www.datacoresoftware.com/products/keyfeatures.shtml.
DataCore Software: Products [online]. DataCore Software Corporation [retrieved Aug. 2, 2000]. Retrieved from the Internet: <URL: http://www.datacoresoftware.com/products/specifications.shtml.
DataCore Software: Products [online]. DataCore Software Corporation [retrieved Aug. 2, 2000]. Retrieved from the Internet: <URL: http://www.datacoresoftware.com/products/hardware.shtml.

(Continued)

*Primary Examiner*—Frantz B. Jean
(74) *Attorney, Agent, or Firm*—Rader, Fishman & Grauer PLLC; Christopher M. Tobin

(57) ABSTRACT

A computer network system includes a client-server architecture, where the client transmits SCSI commands over a network using TCP/IP to a server to request input and output operations for a physical storage device that is communicatively coupled to a storage device. The client perceives the storage device to be a local disk drive, even though the storage device is located on the target side of a network. The system includes a client-side disk-based cache.

25 Claims, 7 Drawing Sheets

OTHER PUBLICATIONS

DataCore Software: Products [online]. DataCore Software Corporation [retrieved Aug. 2, 2000]. Retrieved from the Internet: <URL: http://www.datacoresoftware.com/products/performance.shtml.
DataCore Software: Products [online]. DataCore Software Corporation [retrieved Aug. 2, 2000]. Retrieved from the Internet: <URL: http://www.datacoresoftware.com/products/faqs.shtml.
DataCore Software: Products [online]. DataCore Software Corporation [retrieved Aug. 2, 2000]. Retrieved from the Internet: <URL: http://www.datacoresoftware.com/products/faq_01.shtml.
DataCore Software: Products [online]. DataCore Software Corporation [retrieved Aug. 2, 2000]. Retrieved from the Internet: <URL: http://www.datacoresoftware.com/products/faq_02.shtml.
DataCore Software: Products [online]. DataCore Software Corporation [retrieved Aug. 2, 2000]. Retrieved from the Internet: <URL: http://www.datacoresoftware.com/products/faq_03.shtml.
DataCore Software: Products [online]. DataCore Software Corporation [retrieved Aug. 2, 2000]. Retrieved from the Internet: <URL: http://www.datacoresoftware.com/products/faq_04.shtml.
DataCore Software: Products [online]. DataCore Software Corporation [retrieved Aug. 2, 2000]. Retrieved from the Internet: <URL: http://www.datacoresoftware.com/products/faq_05.shtml.
DataCore Software: Products [online]. DataCore Software Corporation [retrieved Aug. 2, 2000]. Retrieved from the Internet: <URL: http://www.datacoresoftware.com/products/faq_06.shtml.
DataCore Software: Products [online]. DataCore Software Corporation [retrieved Aug. 2, 2000]. Retrieved from the Internet: <URL: http://www.datacoresoftware.com/products/faq_07.shtml.
DataCore Software: Products [online]. DataCore Software Corporation [retrieved Aug. 2, 2000]. Retrieved from the Internet: <URL: http://www.datacoresoftware.com/products/faq_08.shtml.
DataCore Software: Products [online]. DataCore Software Corporation [retrieved Aug. 2, 2000]. Retrieved from the Internet: <URL: http://www.datacoresoftware.com/products/faq_09.shtml.
DataCore Software: Products [online]. DataCore Software Corporation [retrieved Aug. 2, 2000]. Retrieved from the Internet: <URL: http://www.datacoresoftware.com/products/faq_10.shtml.
DataCore Software: Products [online]. DataCore Software Corporation [retrieved Aug. 2, 2000]. Retrieved from the Internet: <URL: http://www.datacoresoftware.com/products/faq_11.shtml.
DataCore Software: Products [online]. DataCore Software Corporation [retrieved Aug. 2, 2000]. Retrieved from the Internet: <URL: http://www.datacoresoftware.com/products/faq_12.shtml.
DataCore Software: Products [online]. DataCore Software Corporation [retrieved Aug. 2, 2000]. Retrieved from the Internet: <URL: http://www.datacoresoftware.com/products/faq_13.shtml.
DataCore Software: Products [online]. DataCore Software Corporation [retrieved Aug. 2, 2000]. Retrieved from the Internet: <URL: http://www.datacoresoftware.com/products/faq_14.shtml.
DataCore Software: Products [online]. [retrieved Aug. 2, 2000]. DataCore Software Corporation [copyright 2000]. Retrieved from the Internet: <URL: http://www.datacoresoftware.com/products/faq_why.shtml.
DataCore Software: Products [online]. [retrieved Aug. 2, 2000]. DataCore Software Corporation [copyright 2000]. Retrieved from the Internet: <URL: http://www.datacoresoftware.com/products/faq_what.shtml.
DataCore Software: Products [online]. [retrieved Aug. 2, 2000]. DataCore Software Corporation [copyright 2000]. Retrieved from the Internet: <URL: http://www.datacoresoftware.com/products/faq_who.shtml.
DataCore Software: Products [online]. [retrieved Aug. 2, 2000]. DataCore Software Corporation [copyright 2000]. Retrieved from the Internet: <URL: http://www.datacoresoftware.com/products/downloads.shtml.
DataCore Software: SAN Industry [online]. [retrieved Aug. 2, 2000]. DataCore Software Corporation [copyright 2000]. Retrieved from the Internet: <URL: http://www.datacoresoftware.com/sanindustry/glossary.shtml.
DataCore Software: SAN Industry [online]. [retrieved Aug. 2, 2000]. DataCore Software Corporation [copyright 2000]. Retrieved from the Internet: <URL: http://www.datacoresoftware.com/sanindustry/links.shtml.
DataCore Software: SAN Industry [online]. [retrieved Aug. 2, 2000]. DataCore Software Corporation [copyright 2000]. Retrieved from the Internet: <URL: http://www.datacoresoftware.com/sanindustry/stats.shtml.
DataCore Software: Services [online]. [retrieved Aug. 2, 2000]. DataCore Software Corporation [copyright 2000]. Retrieved from the Internet: <URL: http://www.datacoresoftware.com/services.shtml.
DataCore Software: Press Room [online]. [retrieved Aug. 2, 2000]. DataCore Software Corporation [copyright 2000]. Retrieved from the Internet: <URL: http://www.datacoresoftware.com/pressroom.shtml.
DataCore Software: Company [online]. [retrieved Aug. 2, 2000]. DataCore Software Corporation [copyright 2000]. Retrieved from the Internet: <URL: http://www.datacoresoftware.com/company.shtml.
DataCore Software: Contact [online]. [retrieved Aug. 2, 2000]. DataCore Software Corporation [copyright 2000]. Retrieved from the Internet: <URL: http://www.datacoresoftware.com/contact.shtml.
CMP's TechWeb The IT Network, TechEncyclopedia [online]. [retrieved Aug. 2, 2000]. The Computer Language Co. Inc. [copyright 1998]. Retrieved from the Internet: <URL: http://www.techweb.com/encyclopediia/defineterm?term=scsi.
CMP's TechWeb The IT Network, TechEncyclopedia [online]. [retrieved Aug. 2, 2000]. The Computer Language Co. Inc. [copyright 1998]. Retrieved from the Internet: <URL: http://www.techweb.com/encyclopedia/defineterm?term=volume.
CMP's TechWeb The IT Network, Techencyclopedia [online]. [retrieved Apr. 11, 2001]. The Computer Language Co. Inc. [copyright 1981-2001;]. Retrieved from the Internet: <URL: http://www.techweb.com/encyclopedia/defineterm?term=TUNNELING&exact=1.
CMP's TechWeb The IT Network, Techencyclopedia [online]. [retrieved Apr. 11, 2001]. The Computer Language Co. Inc. [copyright 1981-2001; retrieved]. Retrieved from the Internet: <URL: http://www.techweb.com/encyclopedia/defineterm?term=IP%20tunneling.
CMP's TechWeb The IT Network, Techencyclopedia [online]. [retrieved Apr. 11, 2001]. The Computer Language Co. Inc. [copyright 1981-2001]. Retrieved from the Internet: <URL: http://www.techweb.com/encyclopedia/defineterm?term=L%32TP.
SCSI Trade Association Home Page [online]. [retrieved Aug. 3, 2000]. Retrieved from the Internet: <URL:http://www.scsita.org/intro.2kJuly3.html.
7 Generations of SCSI [online]. [retrieved Aug. 3, 2000]. Retrieved from the Internet: <URL:http://www.scsita.org/aboutscsi/7gen.html.
SCSI Terms [online]. [retrieved Aug. 3, 2000]. Retrieved from the Internet: <URL:http://www.scsita.org/aboutscsi/terms/scsiterms.html.
SCSI Bibliography [online]. [retrieved Aug. 3, 2000]. Retrieved from the Internet: <URL:http://www.scsita.org/aboutscsi/reads.html.
Larry L. Peterson & Bruce S. Davie, Second Edition, Computer Networks A Systems Approach, pp. 148-151, © 2000 by Morgan Kaufman Publishers, San Francisco, California.
Tom Sheldon, Encyclopedia of Networking, Electronic Edition, pp. 866-868, © 1998 by The McGraw-Hill Companies. Berkeley, California.
SCSI over TCP/IP (IP based SAN). Hewlett-Packard Company (copyright 2000).
IP Storage (ips) [online] [retrieved Feb. 21, 2003]. Retrieved from the Internet: <URL:http://www.ietf.org/html.charters/ips-charter.html.

* cited by examiner

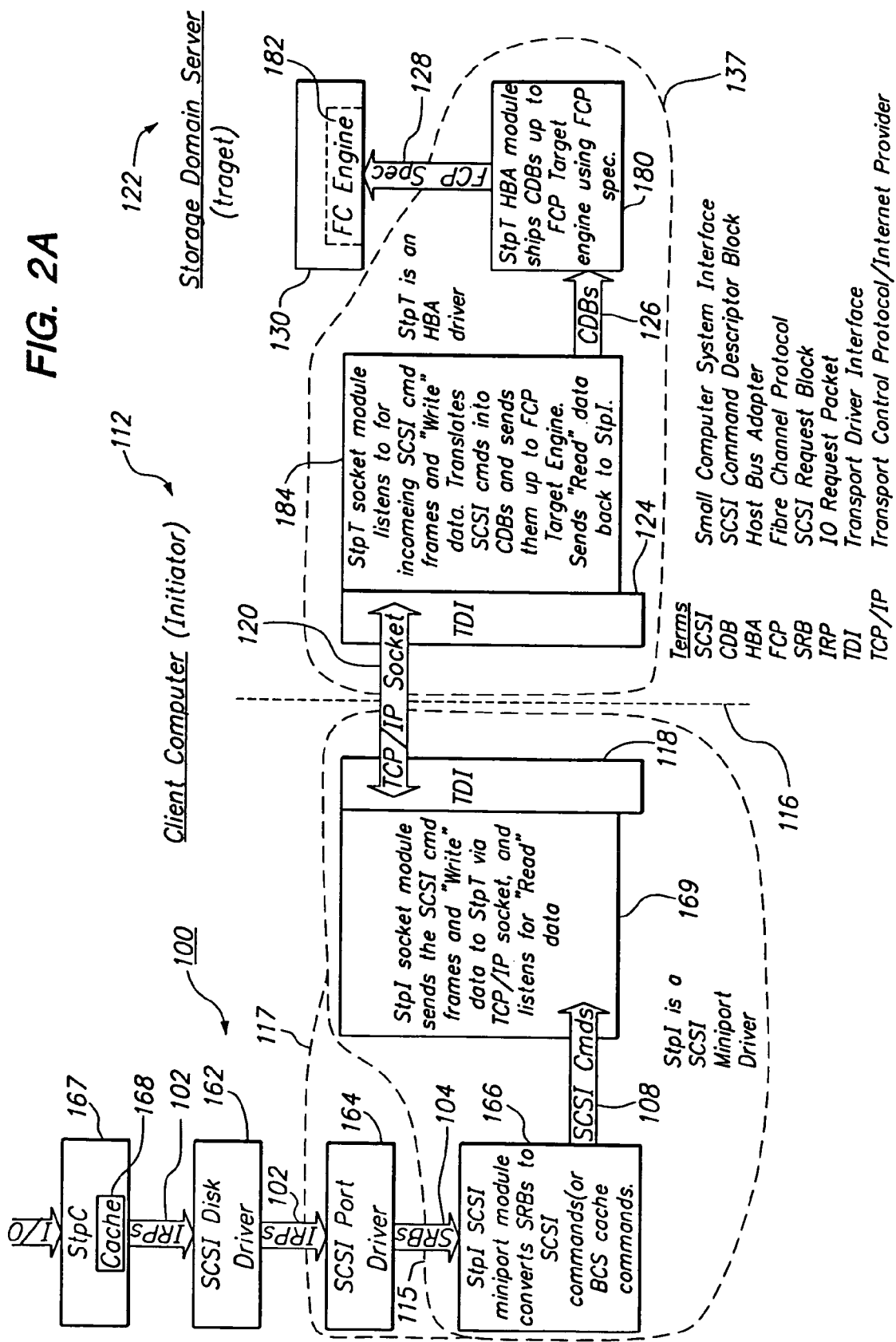

FIG. 3A
Read Command

| INITIATOR | Frame Header | Target |
|---|---|---|
| Send SCSI READ Command>>> | CMDS, NEWC>>> | |
| | <<<CMDS, XFER, SCSI Status | <<<Tell initiator that data is coming |
| | | Prepare to Send Data |
| | <<<Data | <<<Send Data |
| Receive Data and Status | | |
| Command Complete | | |

FIG. 3B
Write Command

| INITIATOR | Frame Header | Target |
|---|---|---|
| Send SCSI WRITE Command>>> | CMDS, NEWC>>> | |
| | <<<CMDS, SNDD | <<<Tell initiator to send Data |
| Tell target Data is coming | | Allocate Buffers |
| Send Data to target | CMDS, XFER Data>>> | Receive Data |
| | <<<CMDS, CMPT, SCSI Status | Send Completion |
| Command Complete | | |

FIG. 6

Frame Header Format

| Byte | 0 | 1 | 2 | 3 |
|---|---|---|---|---|
| 0 | Frame Sync Number ||||
| 4 | Sequence Number ||||
| 8 | Type ||||
| 12 | Event ||||
| 16 | Lun | Status || Flags |
| 20 | Originator Exchange ID ||||
| 24 | Responder Exchange ID ||||
| 28 | Originator Buffer ||||
| 32 | ||||
| 36 | ||||
| 40 | ||||
| 44 | Responder Buffer ||||
| 48 | ||||
| 52 | ||||
| 56 | ||||
| 60 | Transfer Length ||||
| 64 | Frame Sync Number ||||

SCSI TRANSPORT PROTOCOL VIA TCP/IP USING EXISTING NETWORK HARDWARE AND SOFTWARE

CROSS REFERENCE TO RELATED APPLICATIONS

This application claims priority, under 35 U.S.C. § 119(e) from co-pending and commonly-assigned U.S. Provisional Application No. 60/258,003, filed on Dec. 22, 2000 by Edward N. Ignatoff, et al., entitled "SCSI Tunneling Protocol Via TCP/IP Using Existing Network Hardware and Software," which is incorporated by reference herein in its entirety.

BACKGROUND OF THE INVENTION

1. Field of the Invention

The present invention relates generally to computer networks, and more particularly, to enabling network-capable computers to communicate with and to administer storage devices over a network without the need for additional hardware.

2. Description of the Background Art

Many conventional client computers access storage systems over a communications network. Similarly, many conventional client computer systems allow remote file systems to appear as though they were a part of the client's file system. Such systems permit data sharing of storage capacity among computers and servers of various operating systems. Conventional approaches, however, suffer from the drawback that the physical disk drives that store the information shared over the network are owned by the server computer (and not by the client computer). As a result, conventional technologies do not allow a client computer to completely own and manage the physical disk drives. For example, conventional techniques do not enable the client computer to format, partition, and access the physical storage devices as block devices.

In addition, implementing "raw" disk I/O over a network can take several seconds. Conventionally, computers expect a relatively fast response from their respective storage devices. If a client (initiator) computer is expecting data I/O to proceed at disk speeds, this network latency can be problematic, since certain network protocols, such as TCP/IP, do not guarantee response times and can take many seconds to complete a single I/O operation.

As the number and variety of interconnected devices and systems have continued to increase in recent years, users have recognized the advantages of having a variety of devices available for use on their storage systems. One example of a storage system is a SAN (Storage Area Network), which is a high-speed network of storage devices that transfers data among computer systems and storage elements.

Conventionally, small computing devices lack the specialized hardware (such as Fibre Channel hardware) that would enable them to connect to certain types of storage systems, such as a SAN. This deficiency is often due to the absence of internal "real estate" for additional adapter boards or to the cost-prohibited expense of the Fibre Channel hardware.

What is needed is a way to allow standard computers to access, manage, and control storage across a network without needing specialized hardware of dedicated lines, while still maintaining acceptable network latency and access rates. It is also desirable to solve the problem of network latency when storing and retrieving data across a network.

SUMMARY OF THE INVENTION

The present invention operates at least one target storage device over a network. Any computer (the "client") that can be physically connected to a communications network and that supports some transport protocol over the Internet Protocol (IP) can access block storage devices, such as disk drives or a Storage Area Network (SAN), via that network connection. The described embodiments of the invention contemplate performing "block" I/O operations, although the invention is not limited only to block data transfers and could also be used for file-based transfers in certain embodiments.

Most modern computers have networking functionality built-in. The described embodiments of the present invention allow such computers to perform raw block disk I/O with no additional hardware. Thus, the described embodiments of the present invention allow block disk I/O to be effected over existing networking infrastructure. In a preferred embodiment, the deployment of the invention is merely a matter of installing software on the client and target devices.

Because the IP protocol may take seconds to complete a single I/O request depending on network traffic and topology, at least one embodiment of the present invention includes a client-based cache stored on disk, which helps to reduce overall network-related I/O latencies. This cache preferably stores data at the data block level, not at a file system level.

Although the invention can use any Physical/Data Link layer protocol (e.g., IP, Token Ring, FDDI) and any transport layer (e.g., TCP, UDP), one described embodiment uses a TCP/IP protocol run on an Ethernet network. In this embodiment, a computer (the "client") wanting to use storage communicates with another computer (the "target") that "presents" the disks. The target can, in actuality, be a computer, an actual disk drive, or any other system capable of presenting block storage devices to the client over a network connection. Currently DataCore Software Corp. produces such a system called SANSymphony Domain Server (SDS) and the target in at least one described embodiment is an SDS or similar SAN system. Other embodiments use other Physical/Data Link layer protocols (e.g., Token Ring, FDDI) and/or other Transport layers (e.g., UDP).

A described embodiment has two main software components. One is a device driver that runs on the client (called StpI, where I stands for Initiator). The other is a device driver that runs on the target (called StpT, where T stands for Target). StpI and StpT preferably communicate via a TCP/IP connection. StpI receives commands, such as SCSI commands from the client's device driver, and initiates an appropriate data transfer by communicating with StpT on the target. One command may result in multiple transmissions of data blocks between StpI and StpT.

There is a third driver, StpC, that runs on the client and implements a cache component. StpC (intercepts I/O requests originating from application programs and/or the file system, and determines if requested data can be satisfied from the local cache file that it manages. If not, the commands are passed down to StpI for transmission to the target.

The commands from StpI are adapted for transmission over the network in accordance with a TCP/IP format and are transmitted over the network to the target. On the target side, StpT adapts the requests to a format acceptable to the storage device and communicates with the storage device to implement the request.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

BRIEF DESCRIPTION OF THE DRAWINGS

FIG. 2(a) is a data-flow block diagram of one embodiment of the client/server system using the SCSI Transport Protocol/Internet Protocol (STP/IP) in accordance with the present invention.

FIGS. 3(a) and 3(b) are examples of embodiments of the present invention to service, respectively, read and write commands.

FIG. 6 is a block diagram of one possible format of the data packet header transmitted over the network using TCP/IP in accordance with a described embodiment of the present invention.

DETAILED DESCRIPTION OF THE DESCRIBED EMBODIMENTS

Reference will now be made in detail to several embodiments of the present invention, examples of which are illustrated in the accompanying drawings. Wherever practicable, the same reference numbers will be used throughout the drawings to refer to the same or like parts. The Figures depict the described embodiments of the present invention for purposes of illustration only. One skilled in the art will readily recognize from the following discussion that additional embodiments of the structures and methods illustrated herein may be employed without departing from the principles of the invention described herein.

A. Overview of the SCSI Transport Protocol/Internet Protocol (STP/IP)

The present invention is directed to a novel system for enabling network-capable desktop computers, portable computers and other small computers and devices, preferably having a client application (and collectively referred to herein as "clients," or "client computers"), to access storage devices, such as disk drives and SANs, by using their existing and unmodified network access hardware. In accordance with the present invention, I/O requests embodied as SCSI commands are invoked from a client computer and transported over a network using a standard protocol, such as the TCP/IP protocol, to the storage device.

Figure 1A:
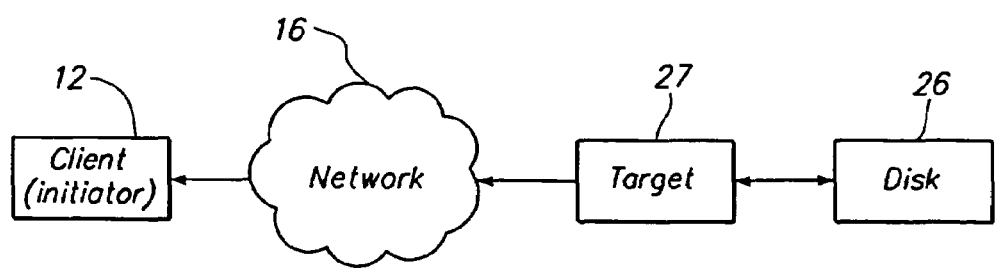
FIGS. 1(a) and 1(b) are block diagrams showing example embodiments of a computer network system in accordance with the present invention.
Figure 1B:
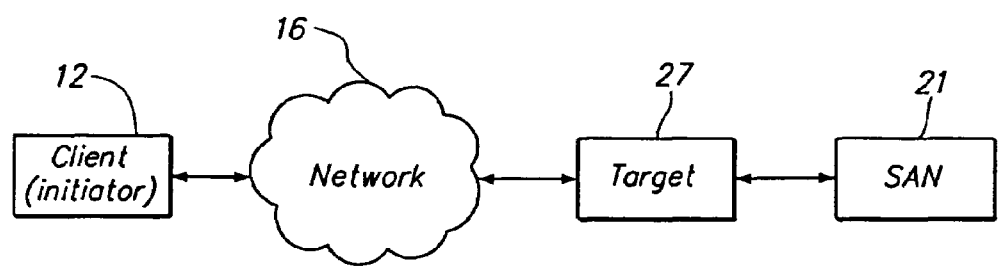

FIGS. 1(a) and 1(b) are block diagrams showing example embodiments of a computer network system in accordance with the present invention.

In FIG. 1(a), a client computer 12 communicates over a network 16 with a server 27, which communicates over a network 16 with a disk drive or disk drives 26.

In FIG. 1(b), client computer 12 communicates over network 16 with a target device 27', which is attached to a Storage Area Network (SAN) 21.

When the SCSI commands are transported over network 16 using a protocol such as TCP/IP, the present invention gives client 16 the "impression" that one or more physical storage devices are directly connected to client 16 by presenting virtual representations of the storage devices to the client 16. The present invention can operate with one or more than one client and with one or more than one storage device or group of storage devices (e.g., with one or more disk drives and/or SANs).

FIGS. 1(a)–1(b) are intended to illustrate that the present invention can be used with a wide variety of storage devices, including but not limited to, disk drives and SANs, including a SAN that is part of a Storage Domain Server (SDS).

The existence of a server application on the target side of a network also allows the client to perform disk administration and to discern storage devices on the target side. A virtual representation of the storage device is presented to the client. In certain embodiments, the virtual storage devices appear as raw disks from the perspective of the client computer, and not as conventional network file systems. Primarily for convenience, the protocol used by the client and target will be referred to collectively as the SCSI Transport Protocol over Internet Protocol (STP/IP). STP/IP allows the client computer to manage the target storage devices as if they were locally connected SCSI disks although they are not, of course.

B. Example Embodiments

A more detailed explanation of embodiments of the present invention is provided below.

FIG. 2(a) shows a data flow block diagram for an embodiment of the invention, showing application modules for processing I/O requests over a system 100, having a client computer 112 coupled to a target storage domain server 122 through a network 116 using TCP/IP. System 100 is similar to the systems of FIGS. 1(a)–1(b). Occasionally, and primarily for context, client 112 will be referred to as the initiator 112 and the server 122 will be referred to as the target 122.

Client 112 includes an StpC driver 167 that communicates with a data cache 168 and that generates I/O Request packets (IRPs) 102 if needed; SCSI Disk Driver 162; a SCSI Port Driver 164 that converts the IRPs 102 to SCSI Request Blocks (SRBs) 104; a SCSI miniport driver 166 for converting the SRB's to SCSI commands 108b; and an StpI Initiator 169 for transmitting SCSI command frames and WRITE data to the server 122, and for listening and receiving READ data from the server 122. The SCSI miniport 166 and StpI socket 169 are referred to collectively as the StpI 115 as indicated by the dotted lines 115. It will be appreciated that the StpI 115 can also include the functions of DCS SCSI Port Driver 164 integrated therein in an alternate embodiment, as indicated by the dashed line 117.

The StpC driver 167 receives I/O requests from application programs and/or the file system. It maintains a set of local disk files (the cache 168), which contain the most recently used blocks of data from the target device(s). If the requested data is present in the cache 168 then the I/O request is satisfied. Otherwise the I/O request is passed to the disk driver 162, which in turn passes it to the StpI driver. The StpI miniport driver 166 converts SRBs to SCSI commands 108.

Cache 168 is preferably stored as files on a local disk of the client computer 112. Thus, cache 168 does not afford high access speeds, as would a conventional memory-based cache, such as a cache used by a file system of the client computer. Because the purpose of the cache 168 is to improve network latency, the described embodiment uses a disk-based cache, which gives slower performance, but allows a much bigger amount of data to be cached (i.e., many gigabits using currently available hard drives). Cache 168 is a block level cache that resides on the initiator, not on the target. A cache "hit" means that the requested data can be found on the local disk drive and, therefore, it is not necessary to spend the relatively long amount of time required to retrieve the data from the target over the network.

When a read operation is issued to StpI it submits the read command to the target over the network. For write operations, the data is written to both the cache 168 and across the network simultaneously.

The cache 168 is preferably implemented as a set of files containing the most recently used disk blocks from the target device. The cache 168 is managed by the StpC driver. Data from a SCSI write command is initially passed to the cache 168 and stored. Cache 168 then forwards the SCSI command to StpI socket module 169 so that the data can also be written to the storage system.

It will be appreciated by those skilled in the art that, by making extensive use of disk-based caching algorithms, the described embodiment can sometimes avoid having to receive data across the network and can, thus, provide latency results better than if no caching features were present. Simultaneously writing data to the cache when data is written to the target will ensure that the data is in the cache the next time it is needed.

The StpI socket module 169 receives SCSI commands 108 and sends the SCSI commands 108 to server 122 through a conventional Transport Driver Interface (TDI) 118 via a conventional TCP/IP socket 120. Additionally, StpI socket module 169 listens for and receives READ data from server 122. The present invention can establish a TCP/IP socket across network 116 by conventionally known techniques.

Target server 122 includes a StpT socket module 184 that listens for incoming SCSI command frames and WRITE data received from client 112 through Transport Driver Interface (TDI) 124 via TCP/IP socket 120. Additionally, StpT socket module 184 translates the SCSI commands received into SCSI Command Descriptor Blocks (CBDs) 126. In the described embodiment, the CBDs 126 are forwarded to StpT Host Bus Adaptor (HBA) module 180. StpT socket module 184 also receives READ data from module 180 and transmits the READ data to client 112 over socket 120. StpT socket modules 184 and StpT HBA module form SCSI over IP Target module 137 (StpT 137) as indicated by the dotted lines 137.

The described embodiment uses a Fibre channel device (such as a SAN or an SDS) as the storage device. Therefore, in the described embodiment, StpT HBA module 180 converts the CDBs to Fibre Channel Commands (FCP Spec commands) and forwards the FCP spec commands to a Fibre Channel (FC) engine 182 in a Fibre channel storage device 130. The FC engine 182 is that set of routines expecting commands supplied in accordance with a standard interface to vendor supplied, hardware-specific drivers for Fibre Channel adapters. In the described embodiment of the present invention, the FC engine 182 is included in a SANsymphony SDS product, available from DataCore Software. SANsymphony is a large system of software running on the target computer.

It will be understood that, although the arrows of FIG. 2(a) do not explicitly show data returning from the StpT server to the StpI server, such data transfer does occur, as described below in more detail in connection with FIGS. 2(b), 3(a) and 3(b).

Figure 2B:
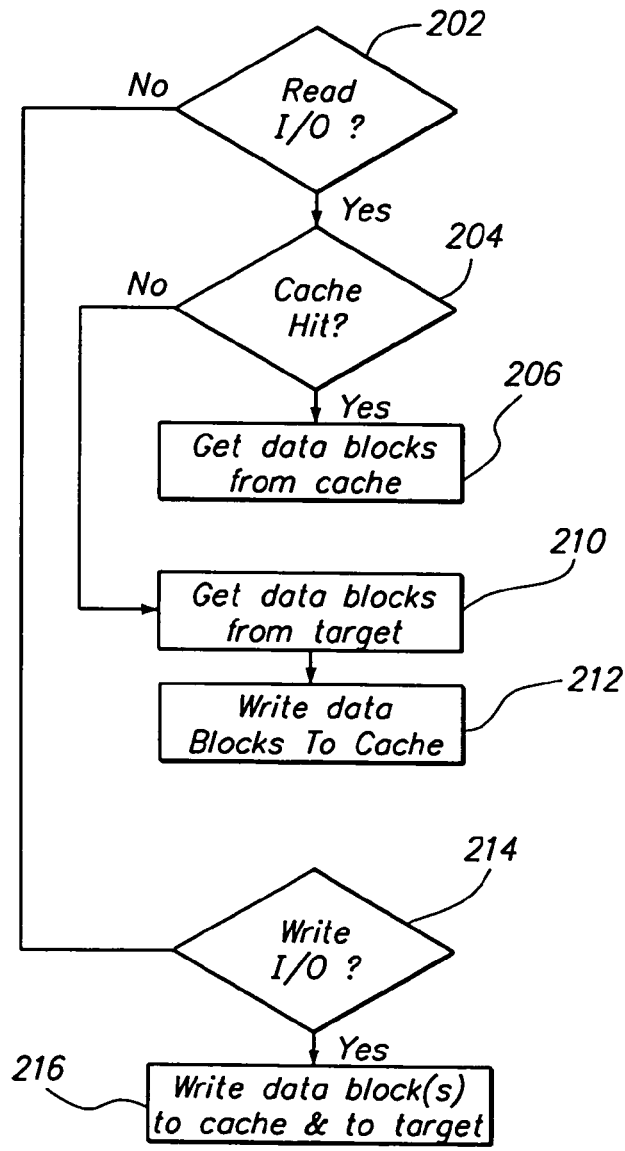
FIG. 2(b) is a flow chart showing a client-based disk cache of FIG. 2(a).

FIG. 2(b) is a flow chart showing a client-based disk cache of FIG. 2(a). If the driver StpC receives a read I/O request 202, if there is a cache hit 204 on disk cache 168, the driver StpC returns data blocks 206 from the disk cache 168. If a cache miss occurs, the I/O request is passed to StpI, which retrieves data from the target as described elsewhere 210. The retrieved data blocks are written 212 into cache 168 using a least recently used method.

If the driver StpC receives a write I/O request 214, StpI writes the data to the target and the data blocks are also written 216 into the cache 168 using a least recently used method. It should be noted that a single read or write may cause the retrieval or storage of multiple data blocks to/from the cache 168.

Figure 2C:
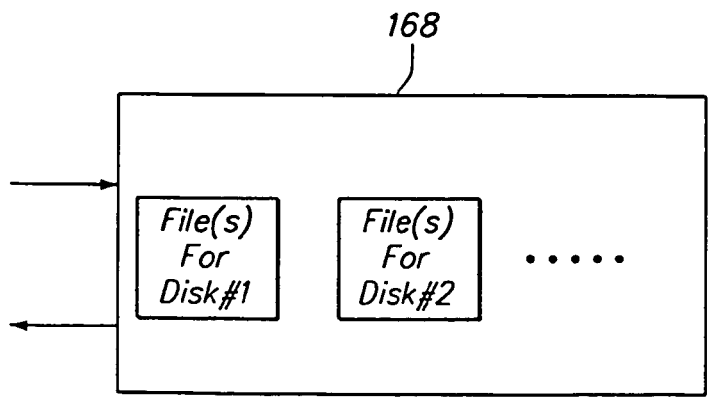
FIG. 2(c) is a block diagram showing additional details of the cache of FIG. 2(a).

In the described embodiment, cache 168 is organized by disk files, as shown in FIG. 2(c) in which the data for each target disk is stored in a separate file. Other embodiments contain multiple cache files for each target device, especially if the target devices are large. Other embodiments store cached data in a database instead of a file system. Still other embodiments store cached data in sequential or indexed files. StpC maintains a cache table (not shown) indicating which disk blocks are resident in cache 168.

In certain embodiments, cache 168 is managed to avoid fragmentation when possible. For example, in some embodiments, if the cache is almost full when a large amount of data is read (and then cached), StpC may discard whatever cached data results in the needed amount of contiguous file space, even though the discarded data is not the least recently used. In some embodiments, if part of the READ data is in cache and part is not, all of the newly read data will be stored in cache and the previously stored, partial data will be removed from cache.

FIGS. 3(a) and 3(b) are examples of embodiments of the present invention to service, respectively, read and write commands. In the described embodiment, an "exchange" is a single logical work unit, such as data to be read or written. An exchange is usually begun by the initiator to be executed by the target. For example, a single SCSI command and the resulting data and status is represented by an exchange. As an exchange moves through its creation to its completion, the different stages are communicated between initiator and target through a series of messages.

For a read command, as shown in FIG. 3(a), the initiator sends a SCSI read command to the target, including in a frame header the specific command "NewC" (for New Command). The target prepares to send data, which may involve reading the data from a disk drive or similar storage media or communicating with a storage network. The target tells the initiator that the data is coming by sending a transfer command, including a frame header containing the specific command "XFER." The target then sends one or more data frames containing data, until the target indicates that the data send is complete.

For a write command, as shown in FIG. 3(b), the initiator sends a SCSI write command to the target, including in a frame header the specific command "NewC" (for New Command). The target prepares to receive data by allocating buffers (if appropriate) and then tells the initiator to send by sending a transfer command, including a frame header containing the specific command "SNDD." The initiator then sends one or more data frames containing data. Once the data send is complete, the target sends a complete "CMPT" frame, along with a status indicator, and the command is complete.

Within an exchange, the initiator and target communicate by passing messages back and forth. Messages are contained in a constant-size Message Frame Header or Frame Header. An example Frame Header format is depicted in FIG. 6. Each field in the example frame header of FIG. 6 is discussed below. It will be understood by persons of ordinary skill in the art that data is also transferred with the appropriate headers, using the standard SCSI format, as known in the art.

The Frame Sync Number is assigned by the originator of the frame, usually the initiator. It is a unique number and it is set in two places in the Frame Header, the first four bytes and the last four bytes. Upon receiving a Frame Header, these two values are compared to assure validity of the Frame Header.

When an initiator begins a new exchange it increments a sequence number and assigns it to the exchange. This sequence number is assigned to the Sequence Number of all Message Headers used in the exchange.

The Type field is the major OpCode of the exchange. This field is set at the birth of an exchange and is not changed. It may be one of the following ASCII values. Those familiar with SCSI commands will appreciate the descriptions provided.

| | |
|---|---|
| 'CMDU' | SCSI Command, Untagged |
| 'CMDS' | SCSI Command, Simple Tagged |
| 'CMDO' | SCSI Command, Ordered Tagged |
| 'CMDH' | SCSI Command, Head of Queue |
| 'LGIN' | Login |
| 'LGUT' | Logout |
| 'CLTK' | Clear Task |
| 'CLTS' | Clear Task Set |
| 'LRST' | Lun Reset |
| 'TRST' | Target Reset |

The Event field is set before the Frame Header is sent. It indicates the "reason" that this Frame Header is being sent and usually tells the receiver to perform some action on the exchange. It may be one of the following ASCII values.

| | |
|---|---|
| 'NCMD' | New SCSI Command is contained in this Frame Header |
| 'SNDD' | Send the requested data |
| 'XFER' | The data requested follows this Frame Header |
| 'CMPT' | The command/exchange is complete |
| 'RSET' | Reset |

The Lun field contains the Logical Unit Number to which the exchange is directed.

The Status field contains the SCSI status of the completed command.

The Flags field is a bit-field indicating whether data will be sent to the target or received by the initiator.

The Originator Exchange ID field contains a unique value of meaning to the initiator. It must be left untouched by the target.

The Responder Exchange ID field contains a unique value of meaning to the target. It must be left untouched by the initiator.

The Originator Buffer is used by the initiator to send small amounts of data to the target. For example, the SCSI command is sent to the target in this field.

The Responder Buffer is used by the target to send small amounts of data to the initiator. For example, the SCSI sense information is sent to the initiator in this field.

The Transfer Length field is used to tell the receiving side (target or initiator) how much data follows.

Figure 4:
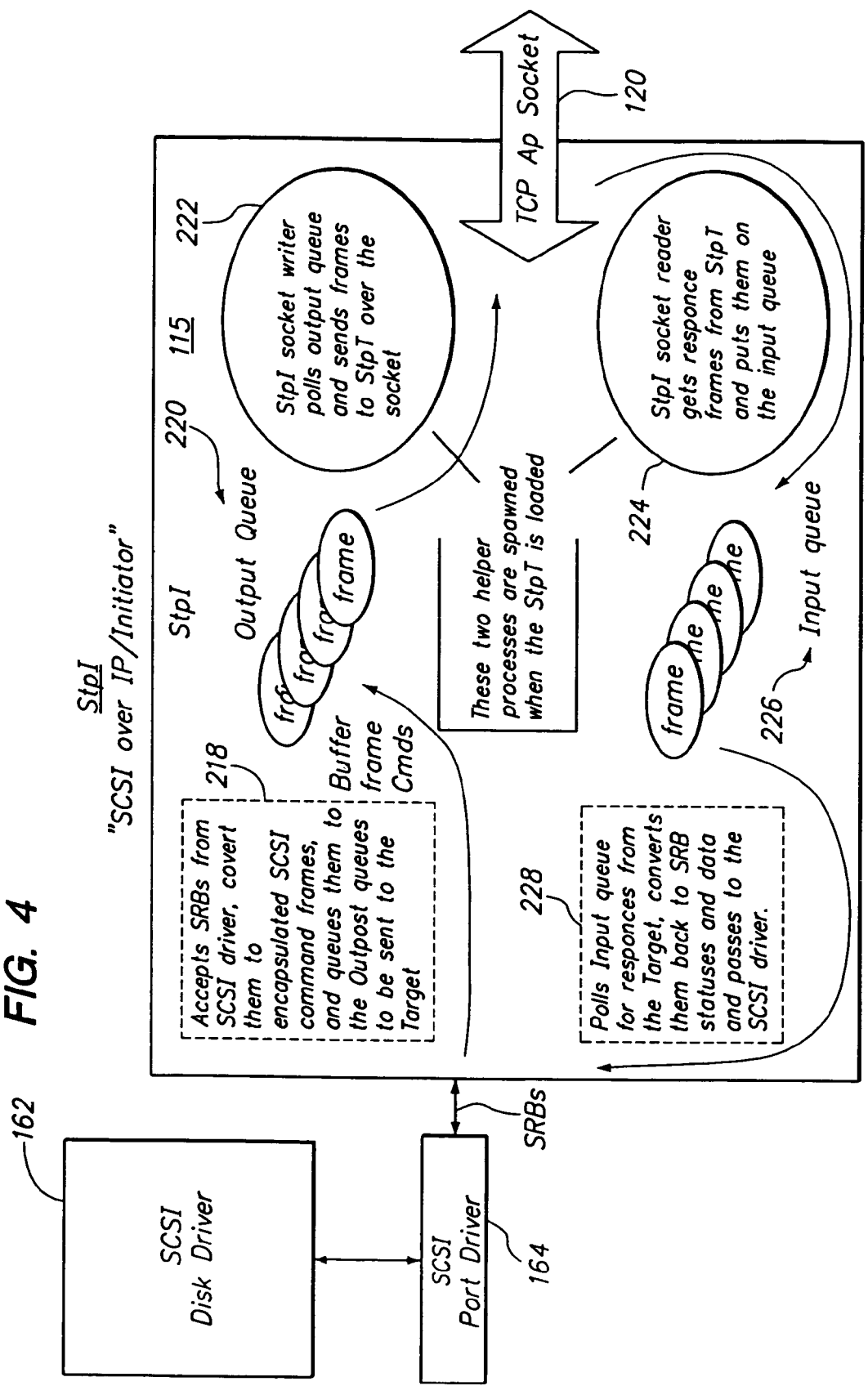
FIG. 4 is a block diagram of the process-flow according to one embodiment of a client application for the system of FIG. 2(a).

FIG. 4 is a block diagram of the process-flow according to one embodiment of a client application for the system of FIG. 2(a). It will be appreciated that this process flow is just one possible way of implementing the present invention and that the caching mechanism is operating in parallel as described above (assuming that a particular embodiment contains a cache).

As the SCSI Request Blocks (SRBs) 104 are received from SCSI driver 164, StpI 115 accepts the SRBs 104, and converts the SRBs into encapsulated SCSI command frames 108 (see reference numeral 218). The SCSI command frames 108 are then placed into an output queue 220 waiting to be sent to the StpT 137 of the Target server 122. StpI 115 includes a socket writer 222 that polls the output queue 220, and sends the queued command frames 108 to StpT 137 over socket 120. StpI 115 also includes a socket reader 224 that obtains response frames from StpT 137, and places the frames received into an input queue 226. StpI polls input queue 226 for the queued responses received from the StpT 137, and converts the responses back to SRB 104 statuses and data (see reference numeral 228). The SRBs are then passed to the SCSI driver 164.

Figure 5:
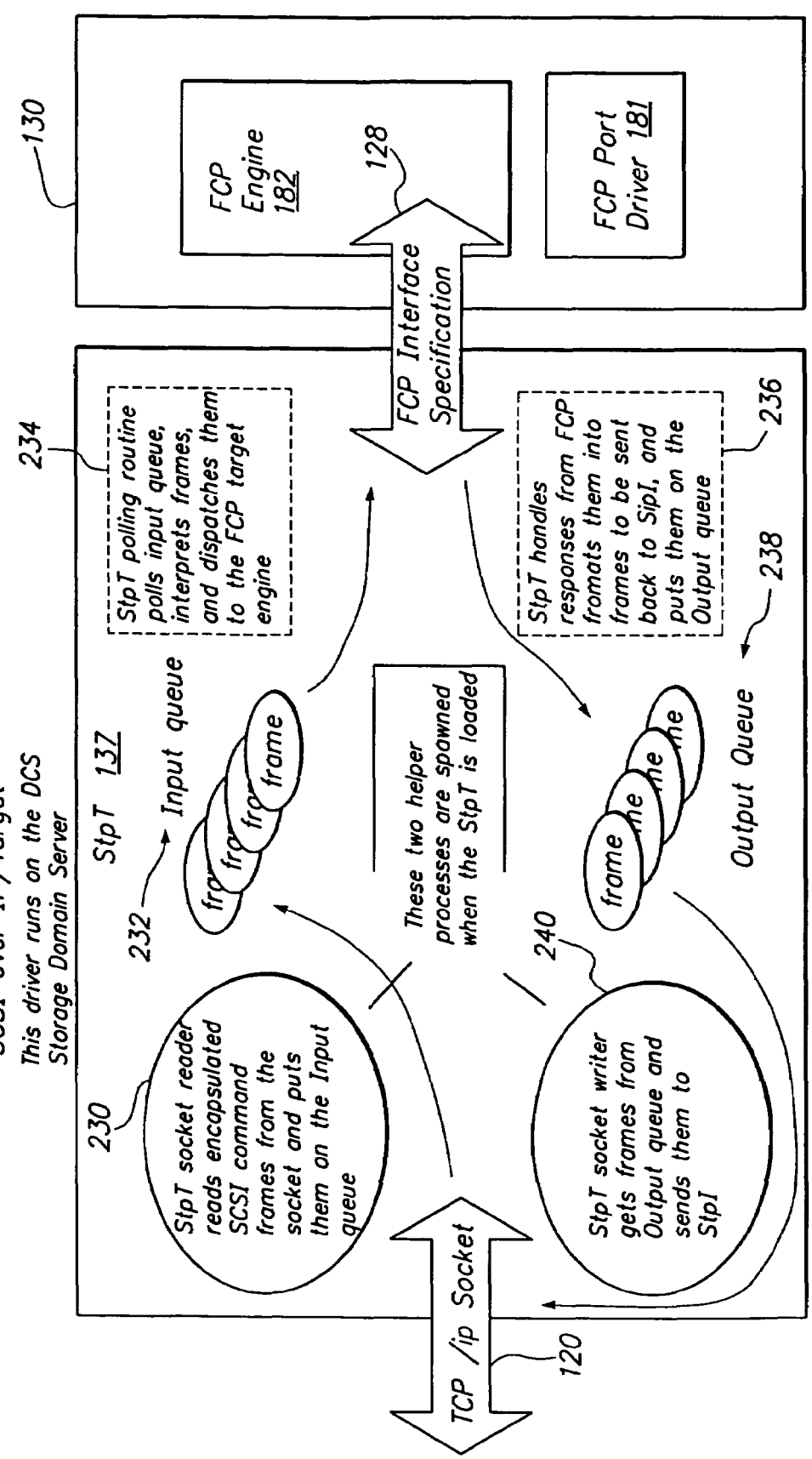
FIG. 5 is a block diagram of the process-flow according to one embodiment of a target application for the system of FIG. 2(a).

FIG. 5 is a block diagram of the process-flow according to one embodiment of a target application for the system of FIG. 2(a). It will be appreciated that this process flow is just one possible way of implementing the present invention and that the caching mechanism is operating in parallel as described above (assuming that a particular embodiment contains a cache).

As the SCSI commands 108, 114 are received across socket 120 from StpI 115, StpT 137 includes a routine 230 which functions as a socket reader for reading the encapsulated SCSI command frames 108. Routine 230 places the command frames 108 and data received into an input queue 232. StpT 137 also includes a routine 234 for polling the input queue 232. Routine 234 interprets the command frames 108 and data, and dispatches such to the FCP engine 182. StpT 137 also includes a routine 236 for handling responses from the FCP engine 182. Routine 236 formats the responses from the FCP engine 182 into frames that are stored in an output queue 238 awaiting transmission to the StpI 115. A routine 240 functioning as a socket writer obtains the frames from queue 238, and sends them to StpI 115.

In summary, the process of StpI 115 interacting with StpT 137 allows SCSI commands originating as disk I/O READ and WRITE commands to be transported over a network using TCP/IP. Use of a block level, disk-based cache on the initiator side of the network allows improvement in network latency and allows the cache to be larger than can generally be achieved with memory-based caches alone. Because the cache operates in parallel and competitively with the main data path, it does not appreciably increase processing time for the transfer of data over the network.

What is claimed is:

1. A method of performing a data operation on a storage device over a network, the method comprising:
   receiving a request for performing a data operation on the storage device, the request using a disk operations format;
   attempting to read a data block from a local cache corresponding to the storage device if the request is to read data from the storage device;
   responsive to not being able to read the data block from the local cache, requesting and receiving the data block from the storage device over the network using a network communications format; and
   writing the data block to the local cache.

2. The method of claim 1, further comprising:
   writing the data block to the local cache and transmitting the data block to the storage device over the network using the network communications format if the request is to write data.

3. The method of claim 1, wherein the local cache is disk-based.

4. The method of claim 1, wherein the storage device is a block-level storage device.

5. The method of claim 1 wherein the storage device is a Storage Area Network.

6. The method of claim 1, wherein the disk operations format implements Small Computer System Interface.

7. The method of claim 6, wherein the network communications format implements Internet Protocol.

8. The method of claim 1, wherein the request is one of a plurality of requests received for performing data operations on a plurality of storage devices, and the local cache corresponds to each of the plurality of storage devices.

9. A computer program product for performing a data operation on a storage device over a network, the computer program product stored on a computer readable medium and adapted to perform operations comprising:
   receiving a request for performing a data operation on the storage device, the request using a disk operations format;
   attempting to read a data block from a local cache corresponding to the storage device if the request is to read data from the storage device;
   responsive to not being able to read the data block from the local cache, requesting and receiving the data block from the storage device over the network using a network communications format; and
   writing the data block to the local cache.

10. The computer program product of claim 9, wherein the local cache is disk-based.

11. The computer program product of claim 9, wherein the disk operations format implements Small Computer System Interface.

12. The computer program product of claim 11, wherein the network communications format implements Internet Protocol.

13. The computer program product of claim 9, wherein the request is one of a plurality of requests received for performing data operations on a plurality of storage devices, and the local cache corresponds to each of the plurality of storage devices.

14. An apparatus for performing a data operation on a storage device over a network, the apparatus comprising:
   means for receiving a request for performing a data operation on the storage device, the request using a disk operations format;
   means for attempting to read a data block from a local cache corresponding to the storage device if the request is to read data from the storage device;
   means for responding to not being able to read the data block from the local cache by requesting and receiving the data block from the storage device over the network using a network communications format; and
   means for writing the data block to the local cache.

15. The apparatus of claim 14, wherein the local cache is disk-based.

16. The apparatus of claim 14, wherein the disk operations format implements Small Computer System Interface.

17. The apparatus of claim 16, wherein the network communications format implements Internet Protocol.

18. The apparatus of claim 14, wherein the request is one of a plurality of requests received for performing data operations on a plurality of storage devices, and the local cache corresponds to each of the plurality of storage devices.

19. A method for accommodating a data operation on a storage device over a network, the method comprising:
   receiving a request for a data block from a client device over the network using a network communications format, the data block corresponding to the storage device and the request being received in response to a cache miss corresponding to an attempt by the client to read the data block from a cache local to the client device;
   using a disk operations format corresponding to the request to read the data block from the storage device; and
   transmitting the data block to the client device in response to the request.

20. The method of claim 19, wherein the disk operations format implements Small Computer System Interface.

21. The method of claim 20, wherein the network communications format implements Internet Protocol.

22. A system for performing a data operation on a storage device over a network, the system comprising:
   a cache module, which receives a request for performing a data operation on the storage device, the request using a disk operations format, and which attempts to read a data block from a local cache corresponding to the storage device if the request is to read data from the storage device;
   an initiator module, in communication with the cache module, which responds to not being able to read the data block from the local cache by requesting and receiving the data block from the storage device over the network using a network communications format; and
   a target module, which receives the request for the data block from the initiator module, reads the data block from the storage device, and sends the data block to the initiator module over the network using the network communications format.

23. The system of claim 22, wherein the local cache is disk-based.

24. The system of claim 22, wherein the disk operations format implements Small Computer System Interface.

25. The system of claim 24, wherein the network communications format implements Internet Protocol.

* * * * *